United States Patent [19]
Hasshi et al.

[11] Patent Number: 5,984,330
[45] Date of Patent: Nov. 16, 1999

[54] STRUT WHEEL SUSPENSION SYSTEM

[75] Inventors: Suehiro Hasshi; Kosuke Uemori, both of Wako, Japan

[73] Assignee: Honda Giken Kogyo Kabushiki Kaisha, Tokyo, Japan

[21] Appl. No.: 09/040,280

[22] Filed: Mar. 18, 1998

[30]    Foreign Application Priority Data

Apr. 10, 1997   [JP]   Japan ..................................... 9-092095

[51] Int. Cl.⁶ ....................................................... B60G 3/26
[52] U.S. Cl. ........................... 280/124.146; 280/124.154; 280/86.751
[58] Field of Search ........................... 280/93.51, 93.512, 280/124.145, 124.146, 124.154, 124.15, 124.142, 124.134, 86.751, 124.1, FOR 118, FOR 124, FOR 126

[56]    References Cited

U.S. PATENT DOCUMENTS 4,911,466   3/1990   Blair ................................. 280/124.146
5,284,353   2/1994   Shinji et al. ...................... 280/124.136
5,597,171   1/1997   Lee ................................... 280/124.138

FOREIGN PATENT DOCUMENTS 4242815   6/1993   Germany .

*Primary Examiner*—Paul N. Dickson
*Attorney, Agent, or Firm*—Armstrong, Westerman, Hattori, McLeland & Naughton

[57]    ABSTRACT

A strut type wheel suspension system is modified so as to allow the camber angle of the wheel to change in the negative direction as the wheel moves upward with respect to the vehicle body. The suspension system includes additional links which jointly convert the vertical movement of a lower part of the knuckle into a lateral movement of an upper part of the knuckle. This allows the camber angle of the outer wheel of a vehicle making a turn to change into a more negative value, and thereby increases the cornering power of the wheel. Thus, the present invention increases the freedom in controlling the camber angle of the wheel without losing the benefits of the simplicity of a strut type wheel suspension system.

5 Claims, 3 Drawing Sheets

STRUT WHEEL SUSPENSION SYSTEM

TECHNICAL FIELD

The present invention relates to a wheel suspension system.

BACKGROUND OF THE INVENTION

Strut type and double wishbone type wheel suspension systems are most commonly used in automobiles as the front wheel suspension systems. Strut type wheel suspension systems are simple in structure, and are therefore relatively inexpensive. However, because the knuckle which rotatably carries a wheel is substantially rigidly attached to the outer tube of the damper, the relative angle between the axle and the damper axis cannot change, and it is therefore difficult to control the camber angle with respect to the vertical travel of the wheel. Double wishbone type wheel suspension systems, on the other hand, allow a large change in the camber angle in dependence on the vertical travel of the wheel, but are relatively complex and expensive because both upper and lower arms are required. Also, a relatively large space is required for accommodating the various components of the suspension system, and the overall weight tends to be significant.

BRIEF SUMMARY OF THE INVENTION

In view of such problems of the prior art, a primary object of the present invention is to provide a wheel suspension system which combines the advantages of a strut type system and a wishbone type system while eliminating the disadvantages of these systems.

A second object of the present invention is to provide a wheel suspension system which is simple in structure, and allows a favorable control of the camber angle with respect to the vertical travel of the wheel.

A third object of the present invention is to provide a wheel suspension system which is economical to manufacture but high in performance.

According to the present invention, these and other objects can be accomplished by providing a wheel suspension system, for supporting a knuckle rotatably carrying a wheel with respect to a vehicle body, comprising: a spring resiliently supporting the knuckle with respect to the vehicle body; a lower arm having an outer end pivotally connected to a lower part of the knuckle and an inner end pivotally attached to a part of the vehicle body; a damper having one end pivotally attached to an upper part of the knuckle via a pivot shaft extending in an fore-and-aft direction of the vehicle body and another end attached to a part of the vehicle body; a substantially vertically extending first link having a lower end pivotally connected to a part of the lower arm slightly inwardly offset from the outer end of the lower arm; a substantially horizontally extending second link having an outer end pivotally connected to an upper part of the knuckle, and an inner end pivotally connected to an upper end of the first link; and a third link having one end pivotally connected to an intermediate part of the second link, and another end pivotally connected to a knuckle-end of the damper.

The vertical stroke of the lower part of the knuckle is greater than that of the lower end of the first link because the lower end of the first link is attached to a point of the lower arm which is inwardly offset from the point of pivotal attachment of the lower part of the knuckle to the lower arm. This produces a corresponding difference between the vertical strokes of the upper part of the knuckle and the upper end of the first link. The second link and the third link form a Scott-Russel approximate linear mechanism which converts the vertical movement of the upper end of the first link to a lateral movement of the outer end of the second link. As a result, as the wheel moves upward or, in other words, as the vehicle body moves downward, the upper part of the knuckle moves inward or, in other words, the camber angle of the wheel is changed in the negative direction. This is beneficial in increasing the cornering power of the outer wheel of the vehicle making a turn.

Preferably, this arrangement may be implemented as a modification of the well-known strut type wheel suspension system, by using a linear damper having a lower end pivotally attached to the upper end of the knuckle and an upper end supported by a part of the vehicle body, and a coil spring coaxially surrounding the linear damper, and having one end supported by the knuckle-end of the damper, and another end supported by a part of the vehicle body. This arrangement is compatible with a knuckle that includes a knuckle arm extending substantially upward from an upper part of the knuckle.

Typically, the third link extends obliquely between the intermediate part of the second link and a point of the linear damper upwardly offset from the point of pivotal attachment between the damper and the knuckle.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
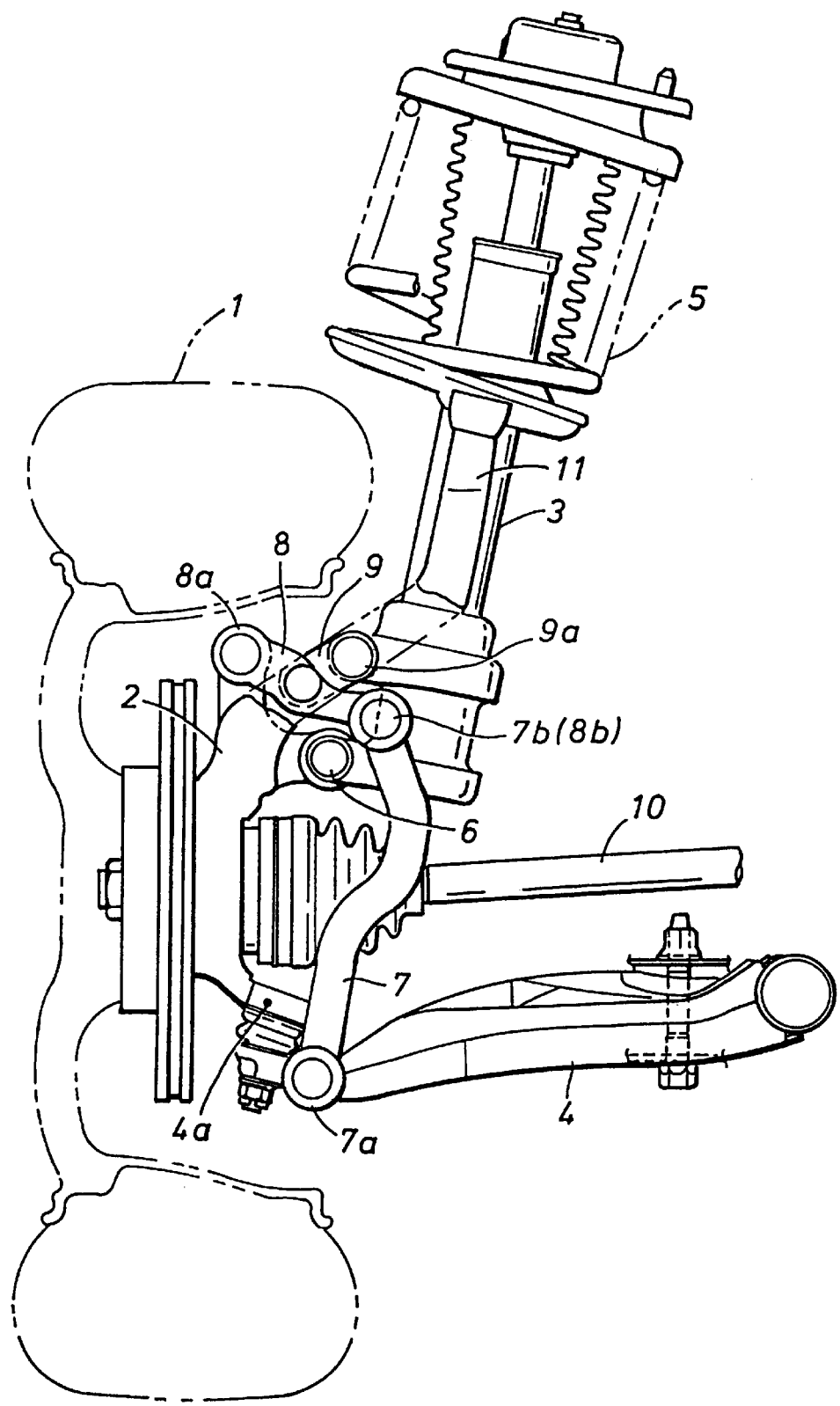
FIG. 1 is a fragmentary front view showing a strut type wheel suspension system embodying the present invention.

FIG. 1 shows a strut type wheel suspension system embodying the present invention which comprises a knuckle 2 rotatably supporting a wheel 1, a linear damper 3 connected between an upper part of the knuckle 2 and a part of the vehicle body such as a front fender, and a lower arm 4 connected between a lower part of the knuckle 2 and another part of the vehicle body such as a side frame. The linear damper 3 extends substantially vertically while the lower arm 4 extends substantially horizontally. A coil spring 5 which coaxially surrounds the linear damper 3 is interposed between an intermediate portion of the outer tube (the knuckle-end) of the linear damper 3 and a fixed part of the vehicle body.

A lower end of the damper 3 is connected to the upper part of the knuckle 2 via a pivot shaft 6 extending in the fore-and-aft direction of the vehicle. The lower part of the knuckle 2 is connected to an outer end of the lower arm 4 via a ball joint 4a. A first link 7 extends substantially vertically, and has a lower end 7a which is pivotally connected to part of the lower arm 4 at a point slightly inwardly offset from the outer end 4a thereof. A second link 8 is pivotally attached, at one end 8a thereof, to a part of the knuckle 2 which is somewhat upwardly and outwardly offset from the part of pivotal attachment (or the pivot shaft 6) between the lower end of the damper 3 and the knuckle 2. The other ends 7b and 8b of the first and second links 7 and 8 are pivotally connected to each other. A third link 9 is connected between an approximately middle part of the second link 8 and a part of the damper 3 which is upwardly offset from the point of pivotal attachment to the knuckle 2 (or the pivot shaft 6).

The wheel 1 is adapted to be turned by a drive shaft 10 which extends laterally with respect to the vehicle body from a transmission not shown in the drawings. A tie rod (not shown in the drawing) is connected to a free end of a knuckle arm 11 which extends substantially vertically upward from the knuckle 2.

Figure 2:
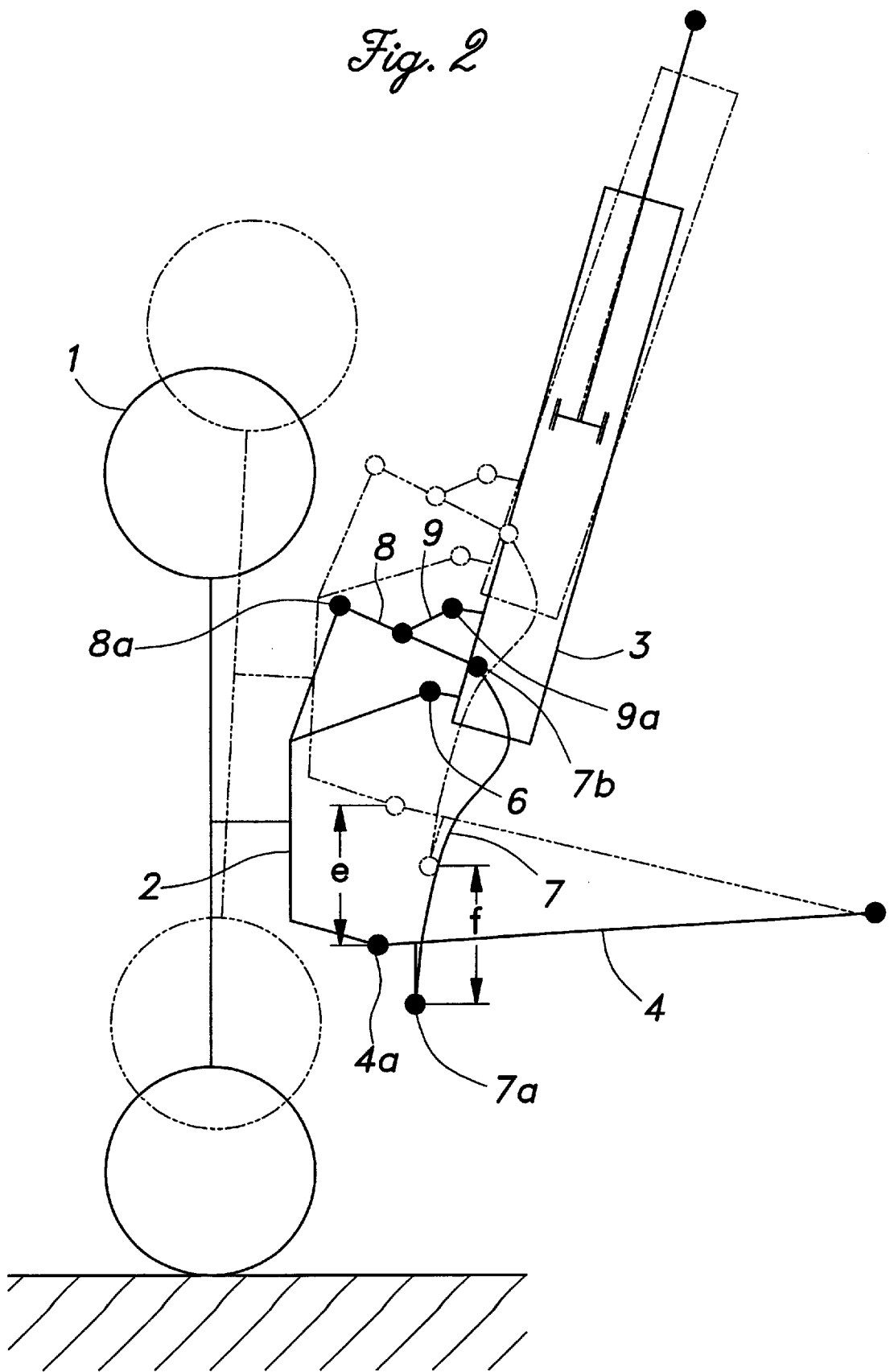
FIG. 2 is a skeleton diagram showing the mode of operation of the wheel suspension system of FIG. 1.

Now the mode of operation of this vehicle suspension system is described in the following with reference FIG. 2.

Because the lower end of the damper 3 and the upper part of the knuckle 2 are pivotally connected to each other via the pivot shaft 6 extending in the fore-and-aft direction, the relative angle between the central axial line of the wheel 1 and the central axial line of the damper 3 can change as the wheel 1 travels vertically. The lower part of the knuckle 2 or the ball joint 4a and the one end 7a of the first link 7 moves vertically as an arcuate motion of two different parts of the lower arm 4. The point of pivotal attachment (the one end 7a of the first link 7) between the first link 7 and the lower arm 4 has a radius of rotation and a center of rotation different from those of the point of pivotal attachment (the center of the ball joint 4a) between the lower arm 4 and the knuckle 2 so that the difference in height (e-f) between the two points (7a and 4a) increases as the wheel 1 travels upward.

The point of pivotal attachment 9a between the third link 9 and the lower part of the damper 3 moves substantially vertically fast with the knuckle 2 which is attached to the damper 3. In other words, the traveling stroke of the point 9a is substantially identical to that of the point 4a when the wheel 1 moves upward. Therefore, the relative distance between the point of pivotal attachment 9a of the damper 3 to the third link 9 and the point of pivotal attachment 7b of the first link 7 to the second link 8 is given by the difference (e-f) mentioned above. Because the second and third links 8 and 9 form a Scott-Russel approximate linear mechanism, the vertical movement of the point 9a with respect to the point 7b is converted into a lateral movement of the point 8a of the second link 8 with respect to the upper part of the knuckle 2. As a result, as the vehicle body moves downward or as the wheel moves upward, the point of pivotal attachment 8a between the knuckle 2 and the second link 8 moves laterally inwards with respect to the vehicle body, and changes the camber angle of the wheel in the negative direction.

Figure 3:
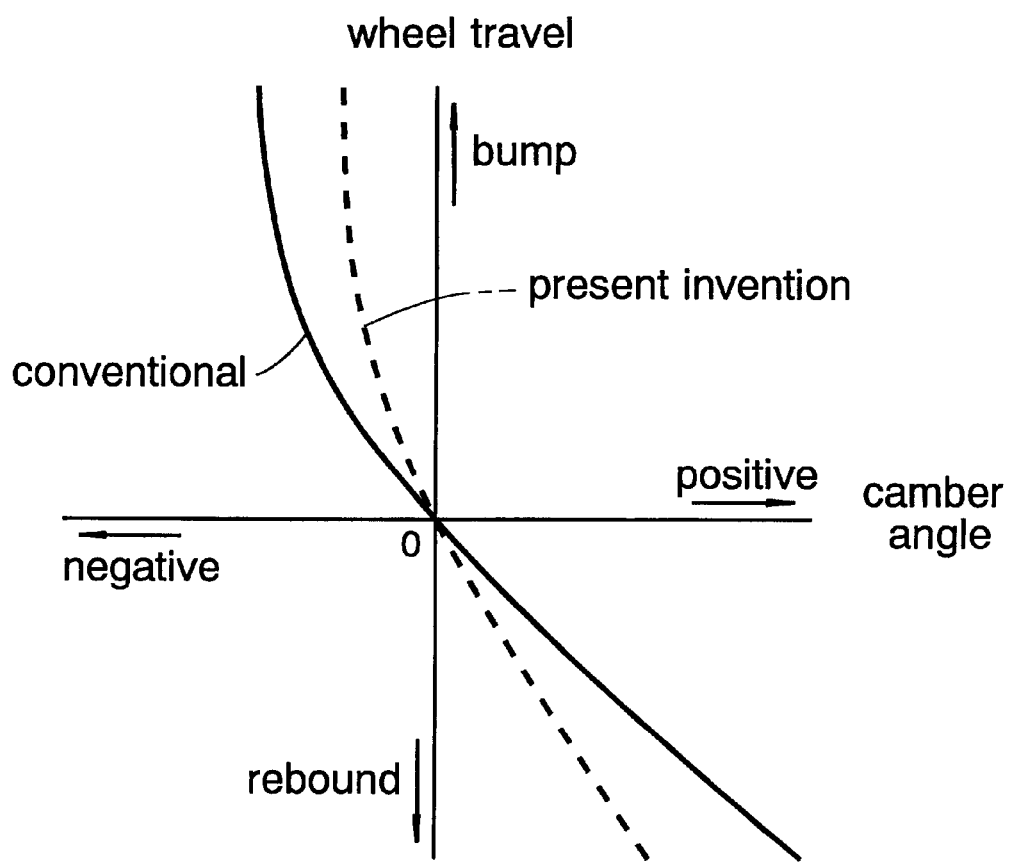
FIG. 3 is a graph showing the relationship between the camber angle and the vertical travel of the wheel.

Thus, as shown in FIG. 3, the strut wheel suspension system according to the present invention causes the camber angle of the wheel to be changed in the more negative direction (the dotted line curve) as the wheel moves upward (the vehicle body moves downward) than the conventional strut wheel suspension system does (the solid line curve). Thus, according to the present invention, the outer wheel of the vehicle during a turn (which moves upward with respect to the vehicle body due to a centrifugal force) is given with a greater capability to support the load, and can produce a greater cornering power.

Thus, the present invention allows the change in the camber angle of the wheel with respect to the vertical travel of the wheel to be controlled as freely as a double wishbone wheel suspension without losing the benefits of the simplicity of a strut wheel suspension system. In particular, the arrangement according to the present invention would not require any substantial increase in the mounting space or any significant change in the structure of the vehicle body when used for replacing a conventional strut wheel suspension system.

Although the present invention has been described in terms of a preferred embodiment thereof, it is obvious to a person skilled in the art that various alterations and modifications are possible without departing from the scope of the present invention which is set forth in the appended claims.

What we claim is:

1. A wheel suspension system, for supporting a knuckle rotatably carrying a wheel with respect to a vehicle body, comprising:

a spring resiliently supporting the knuckle with respect to the vehicle body;

a lower arm having an outer end pivotally connected to a lower part of the knuckle and an inner end pivotally attached to a part of the vehicle body;

a damper having one end pivotally attached to an upper part of the knuckle via a pivot shaft extending in an fore-and-aft direction of the vehicle body and another end attached to a part of the vehicle body;

a substantially vertically extending first link having a lower end pivotally connected to a part of said lower arm slightly inwardly offset from said outer end of said lower arm;

a substantially horizontally extending second link having an outer end pivotally connected to an upper part of the knuckle, and an inner end pivotally connected to an upper end of the first link; and a third link having one end pivotally connected to an intermediate part of said second link, and another end pivotally connected to a knuckle-end of said damper.

2. A wheel suspension system according to claim 1, wherein said damper consists of a linear damper having a lower end pivotally attached to said upper end of the knuckle and an upper end supported by a part of the vehicle body.

3. A wheel suspension system according to claim 2, wherein said spring consists of a coil spring coaxially surrounding said linear damper, and having one end supported by the knuckle-end of said damper, and another end supported by a part of the vehicle body.

4. A wheel suspension system according to claim 1, wherein said third link extends obliquely between said intermediate part of said second link and a point of said linear damper upwardly offset from the point of pivotal attachment between the damper and the knuckle.

5. A wheel suspension system according to claim 1, wherein said knuckle includes a knuckle arm which extends substantially upward from an upper part of the knuckle.

\* \* \* \* \*